(12) United States Patent
Horn et al.

(10) Patent No.: US 7,287,121 B2
(45) Date of Patent: Oct. 23, 2007

(54) SYSTEM AND METHOD OF ESTABLISHING AND RECONFIGURING VOLUME PROFILES IN A STORAGE SYSTEM

(75) Inventors: Robert L. Horn, Yorba Linda, CA (US); Virgil V. Wilkins, Perris, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 269 days.

(21) Appl. No.: 10/743,071

(22) Filed: Dec. 23, 2003

(65) Prior Publication Data

US 2005/0050270 A1    Mar. 3, 2005

Related U.S. Application Data

(60) Provisional application No. 60/497,913, filed on Aug. 27, 2003.

(51) Int. Cl.
*G06F 12/00* (2006.01)
(52) U.S. Cl. .......................... 711/114; 711/170
(58) Field of Classification Search ................ 711/114, 711/170–173; 707/202–205; 709/220–222; 710/8, 15–19; 714/1–7
See application file for complete search history.

(56) References Cited

U.S. PATENT DOCUMENTS

| | | | |
|---|---|---|---|
| 5,651,133 A * | 7/1997 | Burkes et al. | ............... 711/114 |
| 6,237,063 B1 | 5/2001 | Bachmat et al. | |
| 6,487,562 B1 | 11/2002 | Mason, Jr. et al. | |
| 6,502,166 B1 | 12/2002 | Cassidy | |
| 6,510,491 B1 | 1/2003 | Franklin et al. | |
| 6,513,093 B1 | 1/2003 | Chen et al. | |
| 2004/0243699 A1 * | 12/2004 | Koclanes et al. | ........... 709/224 |

* cited by examiner

*Primary Examiner*—Brian R. Peugh
(74) *Attorney, Agent, or Firm*—Dickstein Shapiro LLP

(57) ABSTRACT

A method of predictive baseline volume profile creation for new volumes in a networked storage system and a system for dynamically reevaluating system performance and needs to create an optimized and efficient use of system resources by changing volume profiles as necessary. The system gathers statistical data and analyzes the information through algorithms to arrive at an optimal configuration for volume clusters. Clusters are then reallocated and reassigned to match the ideal system configuration for that point in time. The system continually reevaluates and readjusts its performance to meet throughput requirements specified in the quality of service agreement.

29 Claims, 5 Drawing Sheets

SYSTEM AND METHOD OF ESTABLISHING AND RECONFIGURING VOLUME PROFILES IN A STORAGE SYSTEM

This application claims the benefit of U.S. Provisional Application No. 60/497,913, filed Aug. 27, 2003, the disclosure of which is herein incorporated by reference in its entirety.

FIELD OF INVENTION

The present invention relates to storage systems. More particularly, the present invention relates to allocation and reallocation of clusters to volumes for greater efficiency and performance in a storage system.

BACKGROUND OF THE INVENTION

With the accelerating growth of Internet and intranet communication, high-bandwidth applications (such as streaming video), and large information databases, the need for networked storage systems has increased dramatically. The key apparatus in such a networked storage system is the storage controller. One primary function of storage controllers in a networked storage system is to assume the responsibility of processing storage requests so that the host processors are free to perform other processing tasks. Storage controllers manage all of the incoming, outgoing, and resident data in the system through specialized architectures, algorithms, and hardware. However, it should also be recognized that there is also a need for high performance non-networked storage systems. Thus, while this application consistently discusses network storage systems, it should be recognized that the invention may also be practiced by non-networked storage systems. More particularly, the storage controller of the present invention also may be adapted for non-networked storage systems.

Typical storage controller systems use cluster allocation and volume mapping of those clusters to manage data, I/O, and other administrative tasks within the networked storage system. Clusters reside on volumes formed of a portion of a disk drive or many disk drives in a redundant array of independent disks (RAID) storage architecture. Clusters are typically identical in size; however, each may be assigned to a different RAID architecture. Their physical locations are stored in volume maps, which are updated as new clusters are allocated or deleted. Clusters provide system granularity and aid in the transfer and management of large quantities of data by breaking them down into smaller quantities of data.

The storage system is monitored by one or more data collection mechanisms to evaluate system performance and compare the current performance output to the required output, which is usually outlined in a Quality of Service (QoS) contract. The statistical data gathered by the statistics collection system facilitates achievement of a desired QoS.

In a networked storage system, it is critical that the system perform to a given QoS. In general, each host that accesses the networked storage system establishes a service level agreement (SLA) that defines the minimum guaranteed bandwidth and latency that the host can expect from the networked storage system. The SLA is established to ensure that the system performs at the level specified in the QoS contract.

QoS, redundancy, and performance requirements may not be met after the system has been running for a certain period because the volume profiles that define the system configuration are static and were created prior to system launch. Therefore, any deviation in the types and amounts of data to be processed may affect system performance. In other words, system needs may change over time and, as a result, performance may drop. Many RAID storage architectures account for this decrease in productivity by over-provisioning the system. Over-provisioning is accomplished by increasing the number of drives in the system. More drive availability in the system means more storage space to handle inefficient use of the existing system resources. This solution, however, is a waste of existing system resources and increases costs.

U.S. Pat. No. 6,487,562, "DYNAMICALLY MODIFYING SYSTEM PARAMETERS IN DATA STORAGE SYSTEM," describes a system and method for dynamically modifying parameters in a data storage system such as a RAID system. Such parameters include QoS parameters, which control the speed at which system operations are performed for various parts of a data storage system. The storage devices addressable as logical volumes can be individually controlled and configured for preferred levels of performance and service. The parameters can be changed at any time while the data storage system is in use, with changes taking effect very quickly. These parameter changes are permanently stored and therefore allow system configurations to be maintained. A user interface allows a user or system administrator to easily observe and configure system parameters, preferably using a graphic user interface (GUI) that allows a user to select system changes along a scale from minimum to a maximum.

The method described in the '562 patent offers a solution to over-provisioning in a RAID architecture by introducing a GUI and using external human intervention. While this saves physical disk drive and hardware costs, the costs are now transferred to paying a person to manage and operate the system on a daily basis. Furthermore, the system is prone to human error in the statistical data analysis of the system performance and, as a result, the system may not be filly optimized.

Therefore, it is an object of the present invention to provide a method of optimizing system resources and capabilities in a networked storage system.

It is another object of the present invention to provide a method of configuring system resources that improves system performance.

It is yet another object of the present invention to provide a means to eliminate the need for over-provisioning in a networked storage system.

It is yet another object of the present invention to provide a means to decrease cost in a networked storage system by efficiently utilizing existing system resources.

SUMMARY OF THE INVENTION

The present invention incorporates QoS mechanisms, fine-grain mapping, statistical data collection systems, redundancy requirements, performance measurements, and statistical analysis algorithms to provide a means for predicting volume profiles and dynamically reconfiguring those profiles for optimum performance in a networked storage system.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE PREFERRED EMBODIMENT

Figure 5:
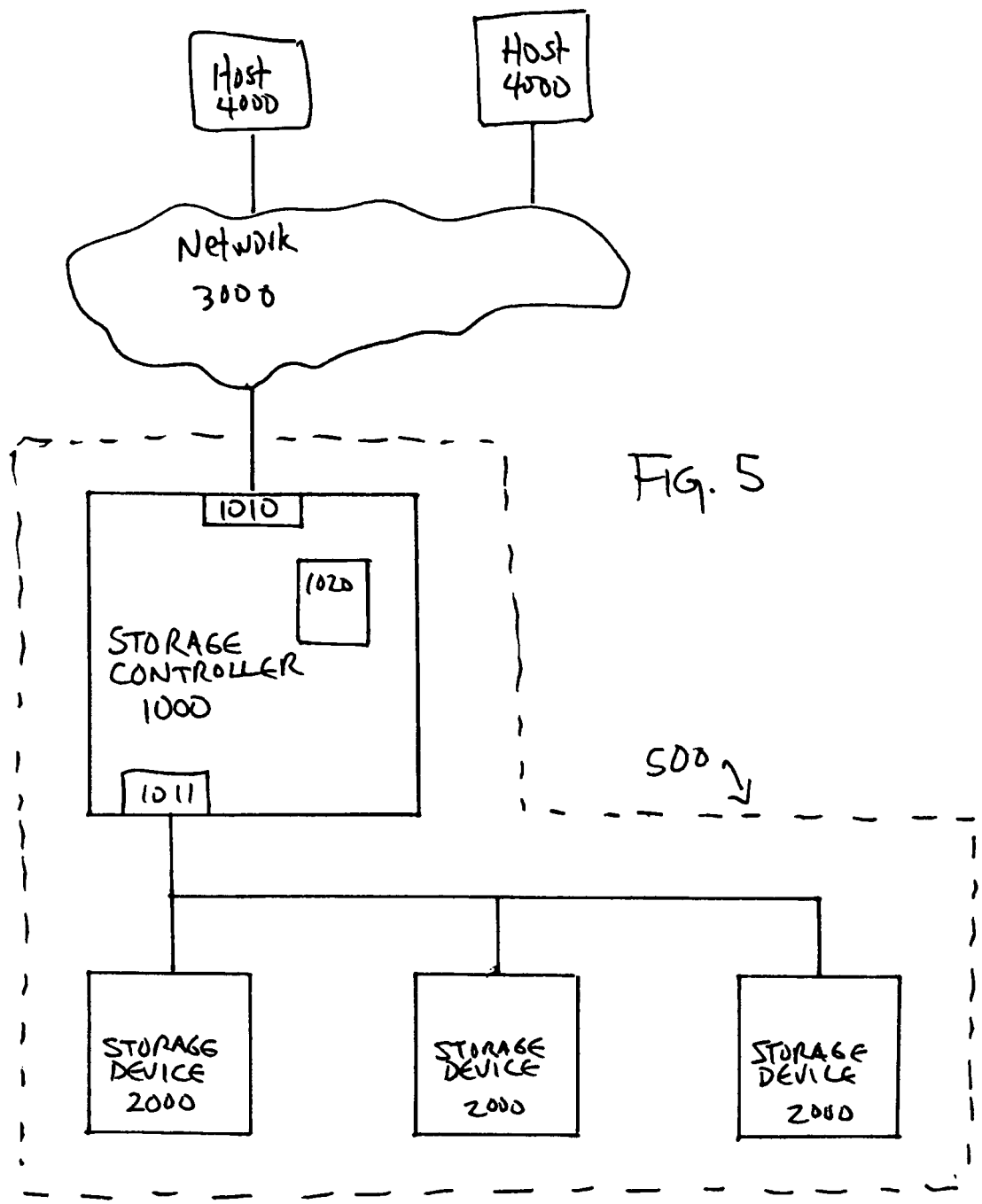
FIG. 5 is a block diagram of a storage system interfaced to a network having two hosts.

Now referring to the drawings, where like reference numerals designate like elements, there is shown in FIG. 5 a block diagram of a storage system 500 in accordance with the principles of the present invention. The storage system 500 includes a first interface 1010 for managing host communications and a second interface 1011 for managing communications with one or more storage devices 2000. The storage devices 2000 may comprise a plurality of clusters (not illustrated) which are each comprised of a plurality of sectors (not illustrated). The storage controller 1000 also includes a memory 1020. The controller 1000 may also comprise one or more functional units (not illustrated), which collectively manage the storage. At least some of the functional units may have access to the memory 1020. As illustrated, the storage system 500 is a networked storage system since the storage system 500 communicates to hosts 4000 over a network 3000. However, interface 1010 may also be a non-network interface, and hosts 4000 may communicate directly with the storage system via interface 1010. Thus, the present invention is also applicable to non-networked storage systems.

Figure 1:
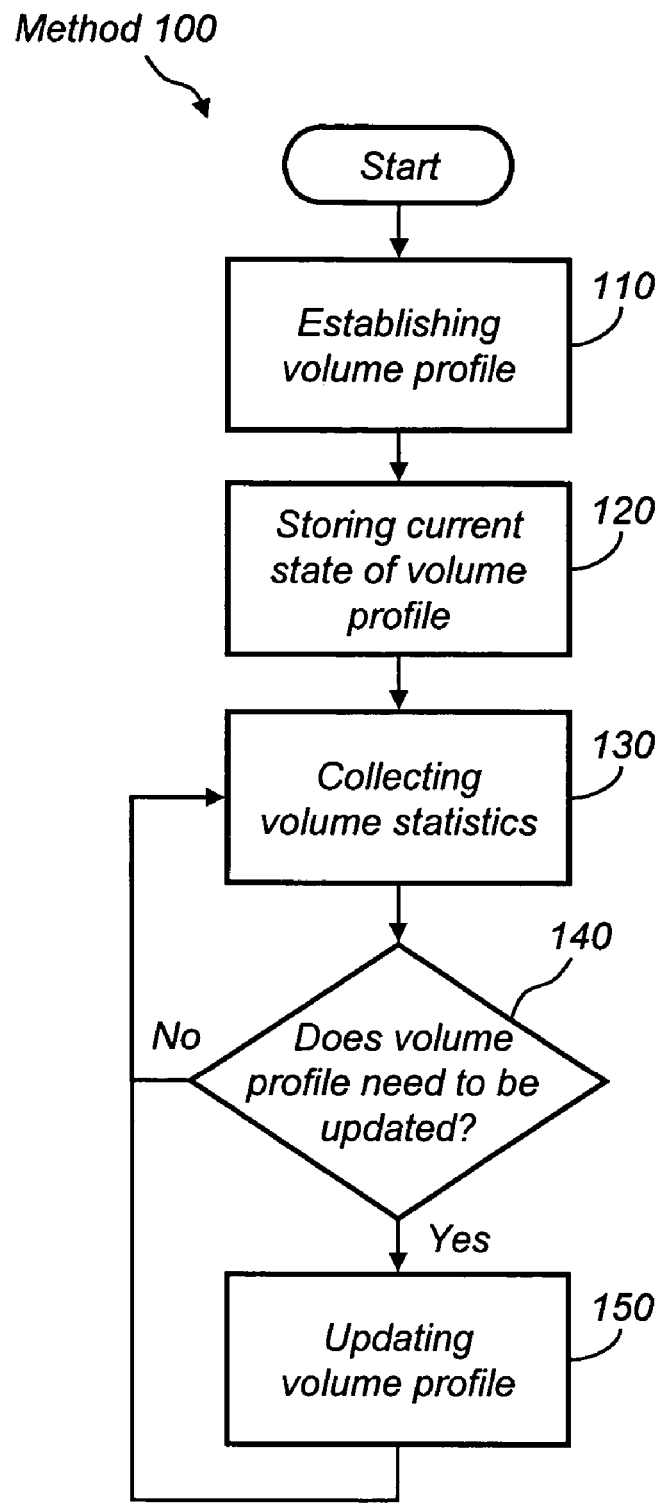
FIG. 1 is a flow diagram of a predictive and dynamically reconfigurable volume profiling method.

FIG. 1 a flow diagram of a predictive and dynamically reconfigurable volume profiling method 100. The method 100 is executed by the controller 1000 and operates as described below:

Step 110: Establishing Volume Profile

In this step, a new volume profile, known as the baseline profile, is created for each new volume. Every volume in the system has a baseline profile created for it as it comes online. New volumes are created in the system when new drives are added, when old volumes are deleted and reused, or when the system is running for the first time.

The baseline volume profile includes information about the size of the volume, the number of drives in the volume, the number of clusters needed to define the volume, the RAID types of those clusters, and their preferred location in relation to the radius or diameter of the disk. Clusters located closer to the outer (i.e., larger) radius are higher-performance clusters than those located toward the inner (i.e., smaller) radius of the disk because the disk inherently spins faster at the outer radius than it does at the innermost radius. The clusters outlined in the baseline volume may or may not be allocated. Clusters that have been allocated also have their disk location stored in the baseline profile. Clusters that have not yet been allocated have only their RAID type stored in the baseline volume profile. In most cases, however, baseline volume profiles do not contain clusters allocated to physical storage space. This allocation occurs later, when the cluster is required for a write action.

The baseline profile is created using predictive algorithms based on QoS requirements, redundancy requirements, the size of the volume, the number of drives per volume, the read/write activity (I/O) that will likely address the volume, the likely amount of data to be read from or written to the volume, and the performance expectations. Method 100 proceeds to step 120.

Step 120: Storing Current State of Volume Profile

In this step, the most current volume profile is stored as a table in memory 1020 so that other system resources may access the information. Method 100 proceeds to step 130.

Step 130: Collecting Volume Statistics

Figure 4:
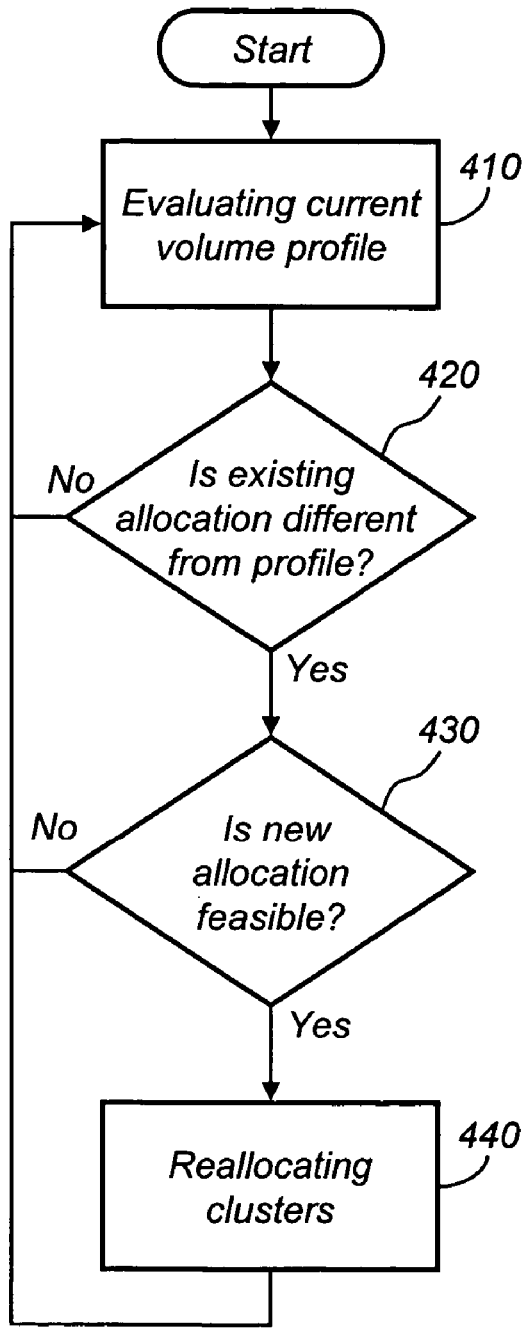
FIG. 4 shows an example I/O density histogram.

In this step, a statistical data collection system begins to gather volume statistics, i.e., information related to host commands. The information may include, for example, total number of read sectors, total number of write sectors, total number of read commands, total number of write commands, and system latency time associated with each read and write command. In one exemplary embodiment, the information is recorded in an I/O density histogram. An exemplary I/O density histogram is illustrated in FIG. 4. In one exemplary embodiment, the statistical collection system is the one which is described in U.S. Application Publication No. 2005/0050269, filed Nov. 17, 2003, entitled "METHOD OF COLLECTING AND TALLYING OPERATIONAL DATA USING AN INTEGRATED I/O CONTROLLER IN REAL TIME," which is hereby incorporated by reference in its entirety.

The data collection system continues to record data from time zero and aggregates the data into the I/O density histogram. At any time, the system may reset the I/O density histogram and begin recording data from that point on. The I/O density histogram is available to other system resources for analyzing and making decisions based on its data. Method 100 proceeds to step 140.

Step 140: Does Volume Profile Need to be Updated?

Figure 2:
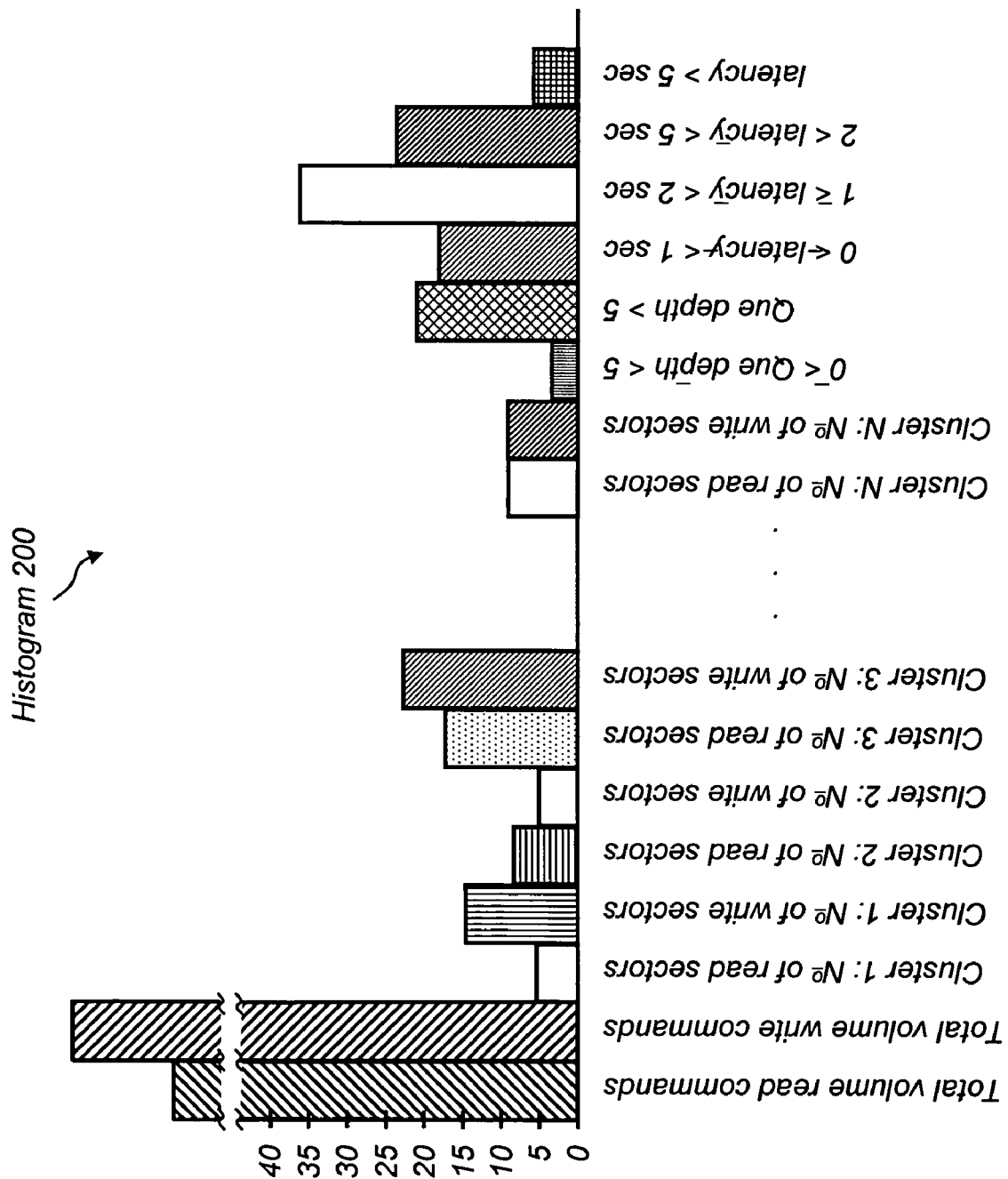
FIG. 2 is a flow diagram of an asynchronous cluster allocation method.

In this decision step, algorithms are used to analyze the statistical data in the I/O density histogram and to compare the results to the current state of the volume profile. The matrix shown in FIG. 2 illustrates example performance-to-configuration decisions that may be made based on the statistical data analysis. For example, a particular cluster may have many more write transactions than read transactions. It should be noted that while clusters are used in the description herein, the present invention may also be practiced by applying the I/O density histogram to storage units other than clusters. In higher capacity storage systems, it may be useful to apply the I/O density histogram to larger allocation units. In general, the present invention may be practiced by applying the I/O density histogram to any type of subvolume granularity, and the size of the subvolume granularity may also be a programmable or configurable quantity. The system may decide that a RAID with redundancy through mirroring (e.g., RAID 10) cluster would be more appropriate than the currently allocated RAID with redundancy through parity (e.g., RAID 5) cluster and that the volume profile should be updated. On the other hand, for example, a RAID 5 cluster may have large numbers of sequential data burst transfers in its histogram and, therefore, the system may decide that the original RAID 5 assignment is correct for that particular cluster. If the volume profile needs to be updated, method 100 proceeds to step 150; if not, method 100 returns to step 130.

Step 150: Updating Volume Profile

In this step, method 100 updates the current volume profile with the decision made in step 140. For example, clusters of one RAID type may be changed to a different RAID type, clusters at inner diameter disk locations may be moved to outer diameter locations. The current volume profile no longer matches the actual system configuration at this point. Other asynchronous methods described in reference to FIG. 3 and FIG. 4 perform the task of matching the system configuration to that of the current volume profile. Method 100 returns to step 130.

FIG. 2 is an example I/O density histogram 200. Data is collected by a system that records all transaction requests for a given volume. Histogram 200 includes data such as the total volume read commands, total volume write commands, number of read sectors for each cluster, number of write sectors for each cluster, etc. Alternately, totals collected by volume region may have courser granularity, where a region is some number of contiguous logical clusters. This may also change the bin size of histogram 200.

The data aggregates from time zero; more data continues to be incorporated as time increases. Histogram 200 is used by method 100 to determine whether a volume profile needs to be updated based on the statistical information contained therein. Method 100 may reset histogram 200 at any time and start a new data collection for another example I/O density histogram 200, perhaps altering histogram 200 granularity. Moreover, method 100 may utilize different types of statistical data depending on system needs. For example, statistical data may include queue depth data or command latency data for a given functional unit of the controller 1000.

Figure 3:
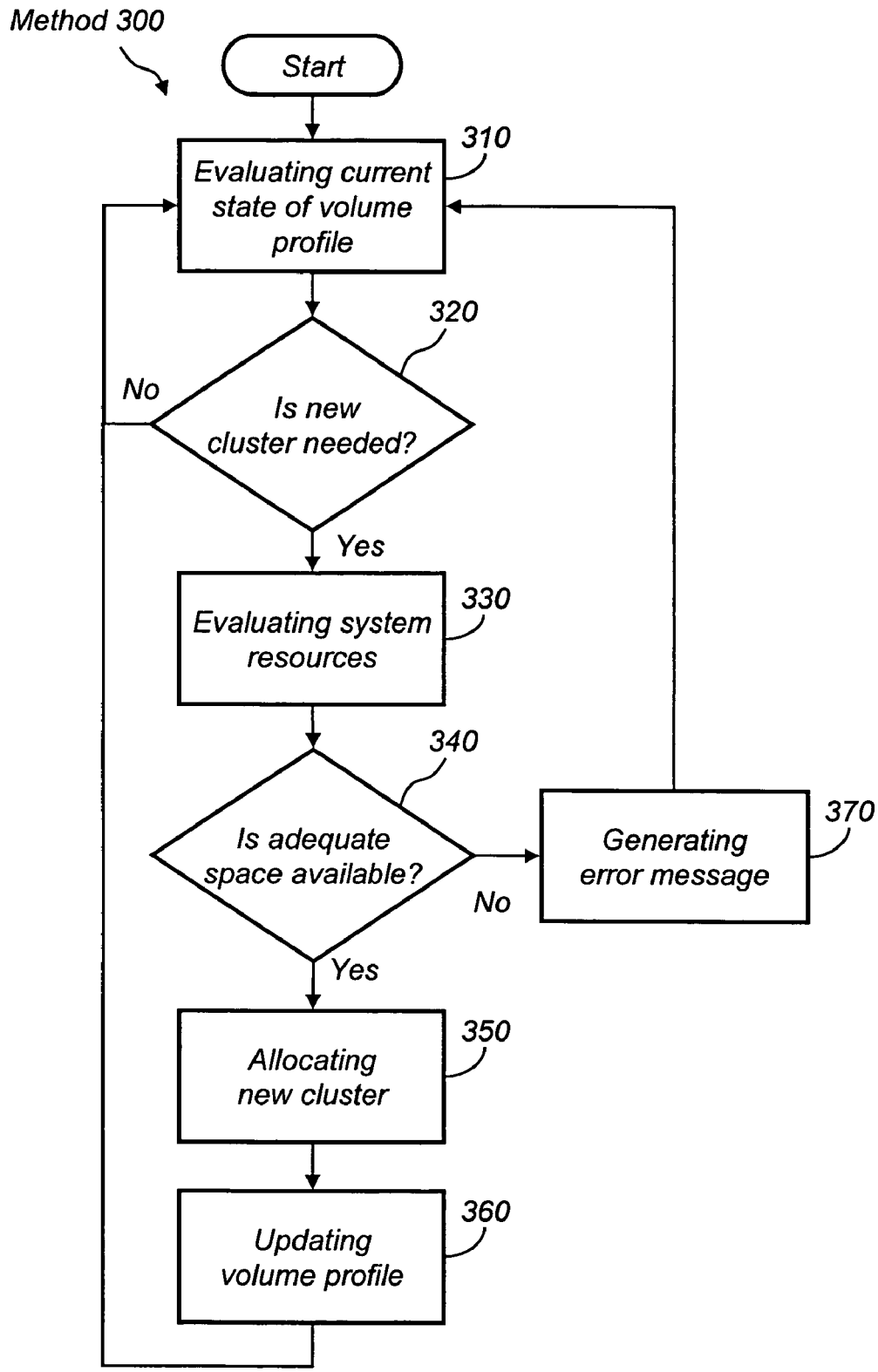
FIG. 3 is a flow diagram of a background reallocation and optimization method.

FIG. 3 is a flow diagram of a cluster allocation method 300.

Step 310: Evaluating Current State of Volume Profile

In this step, the controller 1000 evaluates the current state of the volume profile stored in memory. From the current state volume profile, the controller 1000 knows which clusters have been allocated and which may need to be reserved so that the cluster allocator may allocate them later. Method 300 proceeds to step 320.

Step 320: Is New Cluster Needed?

In this decision step, the controller 1000 evaluates the need for reserving new cluster pointers that coincide with the cluster configurations in the volume profile. Additionally, the controller 1000 may determine that a new cluster is needed due to a message from the cluster free list that it is empty or below threshold. Finally, a system request may trigger the need for a new cluster if a host requests a write to a volume with no cluster allocation. If the controller needs to create a new cluster, method 300 proceeds to step 330; if not, method 300 returns to step 310.

Step 330: Evaluating System Resources

In this step, the controller 1000 looks at system resources to determine where space is available for the new cluster. The controller 1000 scans for any new drives in the system and checks to see if any clusters that have been deleted are ready for reallocation. Method 300 proceeds to step 340.

Step 340: Is Adequate Apace Available?

In this decision step, the controller 1000 determines whether there is physical storage space available for the new cluster identified in step 320. If so, method 300 proceeds to step 350; if not, method 300 proceeds to step 370. In one exemplary embodiment, the controller 1000 includes a functional unit known as a cluster manager (not illustrated), and steps 310, 320, and 330 are executed by the cluster manager.

Step 350: Allocating New Cluster

In this step, the controller 1000 removes a cluster pointer from the head of the appropriate cluster free list and allocates the cluster to its respective volume. Since the allocation process is asynchronous from the cluster reservation process, the cluster allocation may occur at any time after the reservation has been made and does not necessarily follow step 340 chronologically. The controller 1000 sends a message to the cluster manager that the cluster has been allocated and no longer has a status of "reserved". Method 300 proceeds to step 360.

Step 360: Updating Volume Profile

In this step, the cluster controller 1000 updates the volume profile to reflect that a cluster has been allocated. Additional information regarding the position and location of the newly allocated cluster are also added to the volume profile. The new profile is stored in memory as the current volume profile. Method 300 returns to step 310. In one exemplary embodiment, the controller 1000 includes a functional unit known as a cluster allocator (not illustrated), and steps 350 and 360 are executed by the cluster allocator.

Step 370: Generating Error Message

In this step, the system is notified by the controller 1000 that there was an error reserving the requested cluster pointer. Reasons for the failure are recorded in the error message. Method 300 returns to step 310.

FIG. 4 is a flow diagram of a background cluster reallocation and optimization method 400. Method 400 is a background process that runs when there is an opportunity. Method 400 does not have priority over any other system transactions and, therefore, does not contribute to system latency.

Step 410: Evaluating Current Volume Profile

In this step, the system reviews the current state of a volume profile stored in memory and observes the currently allocated clusters and their locations as well as the types of clusters that are in the volume profile. Method 400 proceeds to step 420.

Step 420: Is Existing Allocation Different from Profile?

In this decision step, the system compares the existing allocation of clusters for a particular volume to the optimized cluster allocation in the volume profile and determines whether they are the same. If yes, method 400 proceeds to step 430, if no, method 400 returns to step 410.

Step 430: Is New Allocation Feasible?

In this decision step, the system evaluates its resources to determine whether the new, optimal cluster allocation is feasible given the current state of the system. If yes, method 400 proceeds to step 440; if no, method 400 returns to step 410.

Step 440: Reallocating Clusters

In this step, clusters are reallocated to the optimal type defined by the volume profile. Method 400 returns to step 410.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for operating a storage volume, comprising:
    establishing a profile for the storage volume, said profile being established using a predictive algorithm that is a function of at least one of:
        a predicted read activity that will likely address the volume;
        a predicted write activity that will likely address the volume; and an amount of data likely to be read or written to the volume; and while accepting and executing a host command for said storage volume:

collecting statistical data related to said storage volume, said statistical data including a total number of sectors read and a total number of sectors written, and independently maintaining said collected statistical data for each storage subvolume, each subvolume having a programmable granularity; and analyzing said statistical data to determine whether a performance of said storage volume meets a goal;

if said goal is not met, modifying said profile, the statistical data and a current state of said profile to create a new state of said profile; and modifying said storage volume to be consistent with the new state of said profile.

2. The method of claim 1, wherein said profile comprises information related to at least one of:
   a size of the storage volume;
   a RAID type identifier associated with clusters of the storage volume; and
   a preferred location for clusters of the storage volume.

3. The method of claim 2, wherein said preferred location is specified as a function of a radius from a cluster to a center of a storage device.

4. The method of claim 1, wherein said predictive algorithm is also a function of a quality of service requirement for the storage volume.

5. The method of claim 4, wherein said predictive algorithm is also a function of at least one of:
   a redundancy requirement for the storage volume;
   a size of the storage volume;
   a number of storage devices in the storage volume; and
   a performance expectation for the volume.

6. The method of claim 1, wherein said step of establishing a profile comprises storing said profile in a memory.

7. The method of claim 1, wherein said step of collecting statistical data comprises collecting at least one of a following statistical components:
   a total number of read commands processed;
   a total number of write commands processed;
   a total number of times a command queue for holding pending read or write commands has queue length which coincides with one of a plurality of queue length ranges; and
   a total number of times a latency for processing a read or write command coincides with one of a plurality of latency ranges.

8. The method of claim 1, wherein said step of collecting statistical data comprises forming an I/O density histogram.

9. The method of claim 1, wherein said step of modifying said profile comprises:
   changing a RAID type of a cluster to optimize a frequently performed operation.

10. The method of claim 9, wherein said step of modifying said profile comprises detecting whether a cluster has significantly more write transactions than read transactions and, if said cluster has significantly more write transactions than read transactions, changing a RAID type of the cluster from a type with redundancy through parity to a type with redundancy through mirroring.

11. The method of claim 9, wherein said step of modifying said profile comprises: detecting whether a cluster has significantly number of sequential data burst transfers and, if said cluster has significantly more data burst transfers, changing a RAID type of the cluster to a type with redundancy through parity.

12. The method of claim 9, wherein said step of modifying said profile comprises reallocating a cluster which is located at a relatively small radius from the center of a storage device and requires greater performance to a location having a greater radius from the center of the storage device.

13. The method of claim 1, wherein said goal is based on a quality of service requirement.

14. The method of claim 1, wherein said step of modifying said storage volume comprises determining whether a state of said storage volume is different from said profile and, if the state of said storage volume is different form said profile, determining whether an allocation status consistent with said profile is possible and, if said allocation status consistent with said profile is possible, reallocating clusters of said storage volume to become consistent with said profile.

15. The method of claim 1, wherein said host commands are received from a network.

16. A storage system, comprising:
   a controller having a first interface for communicating with one or more hosts and a second interface; and
   a plurality of storage devices, coupled to the controller via the second interface;
   wherein said controller operates the plurality of storage devices to appear as one or more volumes to the one or more hosts, and for at least one volume the controller accepts a quality of service metric and enforces the quality of service metric by:
      establishing a profile for the storage volume, said profile established as a function of at least one of:
      a predicted read activity that will likely address the volume;
      a predicted write activity that will likely address the volume; and
      an amount of data likely to be read or written to the volume; and
   while accepting and executing a host command for said storage volume,
      collecting a statistical data related to said storage volume, said statistical data including a total number of sectors read and a total number of sectors written, and independently maintaining said collected statistical data for each storage subvolume. each subvolume having a programmable granularity; and
      analyzing said statistical data to determine whether a performance of said storage volume meets a goal;
      if said goal is not met,
         modifying said profile, the statistical data and a current state of said profile to create a new state of said profile; and
         modifying said storage volume to be consistent with the new state of said profile.

17. A computer system, comprising:
   at least one host;
   a storage system, coupled to said at least one host, said storage system further comprising:
      a controller; and
      a plurality of storage devices, coupled to said controller;
   wherein said controller operates the plurality of storage devices to appear as one or more volumes to the host, and for at least one volume the controller accepts a quality of service metric and enforces the quality of service metric by:

establishing a profile for the storage volume, said profile established as a function of at least one of:
a predicted read activity that will likely address the volume;
a predicted write activity that will likely address the volume; and
an amount of data likely to be read or written to the volume; and while accepting and executing a host command for said storage volume,
collecting a statistical data related to said storage volume, said statistical data including a total number of sectors read and a total number of sectors written, and independently maintaining said collected statistical data for each storage subvolume, each subvolume having a programmable granularity; and
analyzing said statistical data to determine whether a performance of said storage volume meets a goal;
if said goal is not met,
modifying said profile, the statistical data and a current state of said profile to create a new state of said profile; and
modifying said storage volume to be consistent with the new state of said profile.

18. A method for operating a storage volume, comprising:
establishing a profile for the storage volume, said profile comprising information related to at least one of:
a size of the storage volume;
a RAID type identifier associated with clusters of the storage volume; and
a preferred location for clusters of the storage volume, said preferred location being specified as a function of a radius from a cluster to a center of a storage device;
said profile being established using a predictive algorithm that is a function of at least one of:
a predicted read activity that will likely address the volume;
a predicted write activity that will likely address the volume; and
an amount of data likely to be read or written to the volume; and
while accepting and executing a host command for said storage volume:
collecting statistical data related to said storage volume; and
analyzing said statistical data to determine whether a performance of said storage volume meets a goal;
if said goal is not met,
modifying said profile, the statistical data and a current state of said profile to create a new state of said profile; and
modifying said storage volume to be consistent with the new state of said profile.

19. The method of claim 18, wherein said predictive algorithm is also a function of a quality of service requirement for the storage volume.

20. The method of claim 19, wherein said predictive algorithm is also a function of at least one of:
a redundancy requirement for the storage volume;
a size of the storage volume;
a number of storage devices in the storage volume; and
a performance expectation for the volume.

21. The method of claim 18, wherein said step of establishing a profile comprises storing said profile in a memory.

22. The method of claim 18, wherein said step of collecting statistical data comprises collecting at least one of a following statistical components:
a total number of read commands processed;
a total number of write commands processed;
a total number of times a command queue for holding pending read or write commands has queue length which coincides with one of a plurality of queue length ranges; and
a total number of times a latency for processing a read or write command coincides with one of a plurality of latency ranges.

23. The method of claim 18, wherein said step of collecting statistical data comprises forming an I/O density histogram.

24. The method of claim 18, wherein said step of modifying said profile comprises:
changing a RAID type of a cluster to optimize a frequently performed operation.

25. The method of claim 24, wherein said step of modifying said profile comprises detecting whether a cluster has significantly more write transactions than read transactions and, if said cluster has significantly more write transactions than read transactions, changing a RAID type of the cluster from a type with redundancy through parity to a type with redundancy through mirroring.

26. The method of claim 24, wherein said step of modifying said profile comprises detecting whether a cluster has significantly number of sequential data burst transfers and, if said cluster has significantly more data burst transfers, changing a RAID type of the cluster to a type with redundancy through parity.

27. The method of claim 24, wherein said step of modifying said profile comprises reallocating a cluster which is located at a relatively small radius from the center of a storage device and requires greater performance to a location having a greater radius from the center of the storage device.

28. The method of claim 18, wherein said goal is based on a quality of service requirement.

29. The method of claim 18, wherein said step of modifying said storage volume comprises determining whether a state of said storage volume is different from said profile and, if the state of said storage volume is different form said profile, determining whether an allocation status consistent with said profile is possible and, if said allocation status consistent with said profile is possible, reallocating clusters of said storage volume to become consistent with said profile.

* * * * *